Sept. 3, 1968 G. J. FISCHER 3,399,614
REMOTELY CONTROLLED MOUNTS
Filed June 15, 1965 6 Sheets-Sheet 1

INVENTOR
GEORGE J. FISCHER
BY
*Alfred v Petchaft*
ATTORNEY

INVENTOR
GEORGE J. FISCHER
BY
ATTORNEY

Sept. 3, 1968          G. J. FISCHER          3,399,614
                    REMOTELY CONTROLLED MOUNTS
Filed June 15, 1965                          6 Sheets-Sheet 3

INVENTOR
GEORGE J. FISCHER

BY
*Alfred W. Petchaft*

ATTORNEY

Sept. 3, 1968 G. J. FISCHER 3,399,614
REMOTELY CONTROLLED MOUNTS
Filed June 15, 1965 6 Sheets-Sheet 4

INVENTOR
GEORGE J. FISCHER
BY
Alfred W Petchaft
ATTORNEY

Sept. 3, 1968  G. J. FISCHER  3,399,614
REMOTELY CONTROLLED MOUNTS
Filed June 15, 1965  6 Sheets-Sheet 5
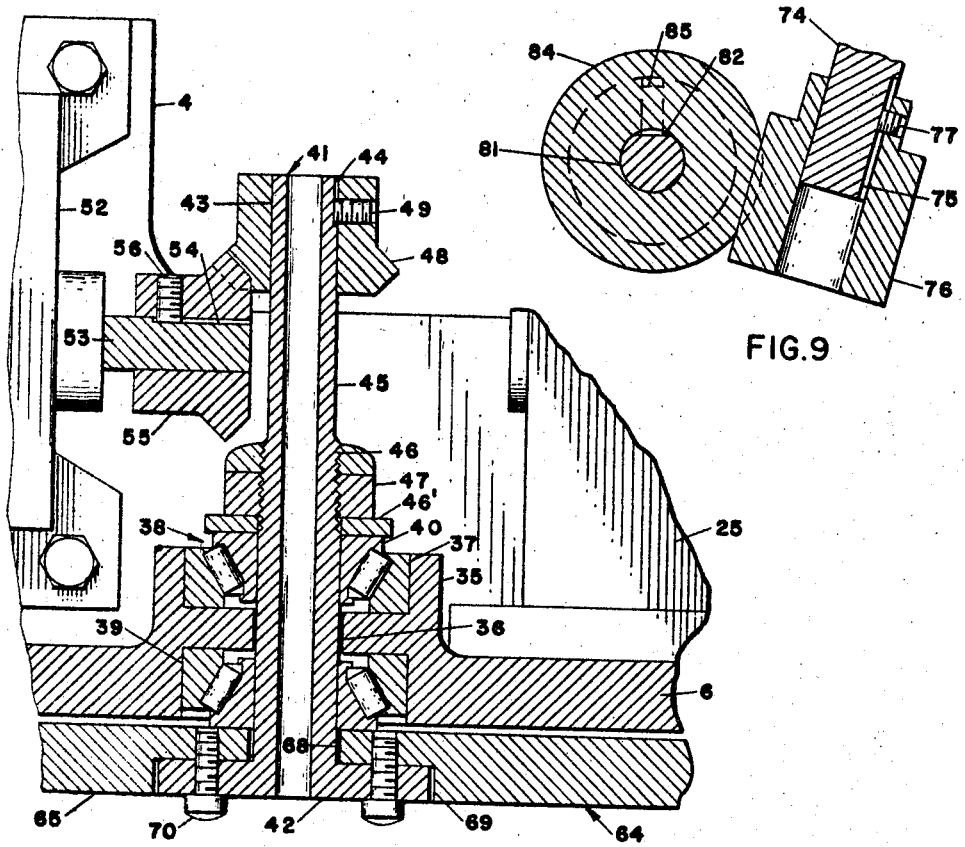
FIG. 5
FIG. 9
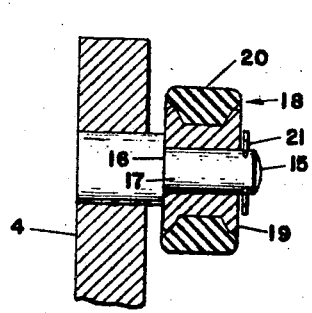
FIG. 6
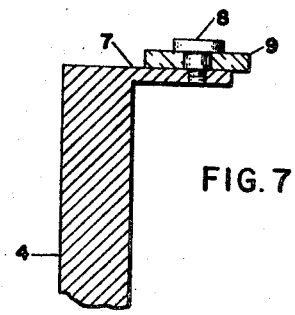
FIG. 7
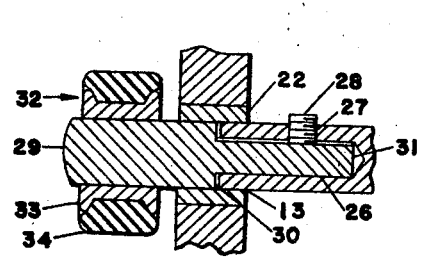
FIG. 8
INVENTOR
GEORGE J. FISCHER
BY
Alfred W Petchaft
ATTORNEY INVENTOR
GEORGE J. FISCHER
BY
*Alfred W. Petchaft*
ATTORNEY

United States Patent Office 3,399,614
Patented Sept. 3, 1968

3,399,614
REMOTELY CONTROLLED MOUNTS
George J. Fischer, 569 Melville,
St. Louis, Mo. 63130
Filed June 15, 1965, Ser. No. 463,992
5 Claims. (Cl. 95—86)

ABSTRACT OF THE DISCLOSURE

A camera mount has a truck which can be driven in either direction along an elongated track by a reversible electric motor, has a turntable which can be rotated in either direction relative to said truck by a second reversible electric motor, has a tilt table which can be tilted in either direction relative to said turntable and hence relative to said truck by a third reversible electric motor, and has an elongated cable that has one end thereof movable with said truck to permit remote control of the direction and duration of movement of said truck and of said turntable and of said tilt table.

---

This invention relates in general to remotely controlled mounts and more particularly, to a remotely controlled television camera mount capable of three movements.

Within the past few years, closed circuit television has become increasingly popular as a means of instruction, and as a means for observing remote locations without actually stationing an individual in the location.

Closed circuit television has been found particularly suitable for instruction in hospitals where the instruction involves the observation of an operation. Heretofore, in conducting such instruction it has been the practice for the students either to look over the shoulder of the attending surgeon, or else sit in an auditorium above and around the operating table and look down upon the operation from above through glass windows. If the student chooses to observe the operation from the floor of the operating room, he must first spend valuable time robing and scrubbing with antiseptics to preserve the cleanliness and germ-free atmosphere of the operating room. Moreover, the large number of doctors and nurses which attend modern medical operations, often obstruct the student's view. Furthermore, a possibility exists that the student might interfere with the conduct of the operation itself. If the auditorium method of instruction is used, the students often have difficulty observing the critical steps of the operation, for they must necessarily be seated a considerable distance from the operating table. Again it is also possible that the individuals participating in the operation may obstruct the observer's view. Conventional closed circuit television offers advantages over the aforementioned methods of hospital instruction, but it also has disadvantages, namely, in the presence of a cameraman and his equipment within the operating room. Moreover, unless the cameraman with his camera is suspended in some way above the operating table, he will not be able to provide a good picture of the operation.

As previously mentioned, closed circuit television cameras are often used to observe locations where it is impractical or uneconomical to station an individual. For example, to detect shoplifters, large stores often mount television cameras at the beginnings of long aisles and thereby provide a view of many aisles at one location by employing a plurality of television receivers each connected to an individual camera. Closed circuit television cameras often peer at bank doors and cashier windows to observe any unusual or suspicious occurrence. Prisons use closed circuit television to observe the conduct of inmates. Police in some cities use remotely disposed television cameras to observe the traffic and control the signals at large complicated intersections. Factories in some instances have replaced night watchmen with closed circuit television.

Usually when a television camera is employed to observe a remote location it is not effectively utilized because it is securely mounted in one position and thus has a very limited field of view. Wider fields of view have been obtained by using more than one camera, but this, of course, is expensive.

It is therefore the primary object of the present invention to provide a remotely controlled mount which is capable of lateral movement and movement about two axes.

It is another object of the present invention to provide a remotely controlled mount of the type stated which is simple and rugged in construction and economical to manufacture.

It is a further object of the present invention to provide a remotely controlled mount of the type stated which is compact and attractive in appearance.

It is an additional object of the present invention to provide a television camera mount which is silent in operation and does not interfere with a signal sent from the television camera attached thereto.

With the above and other objects in view, my invention resides in the novel features of form, construction, arrangement, and combination of parts presently described and pointed out in the claims.

In the accompanying drawings

Figure 3:
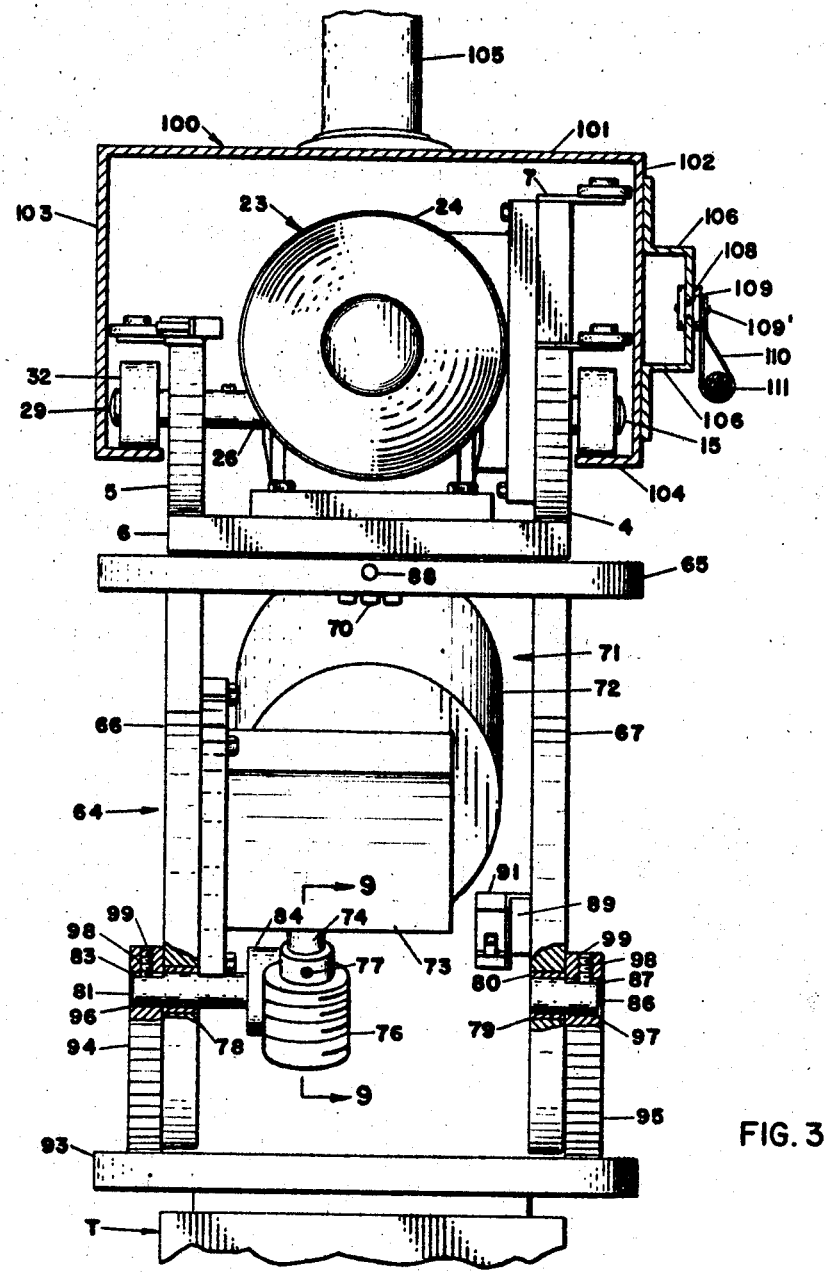
FIG. 3 is a fragmentary elevational view, partially broken away and in section, of a remotely controlled mount constructed in accordance with and embodying the present invention and showing a television camera secured to the tilt table.
Figure 4:
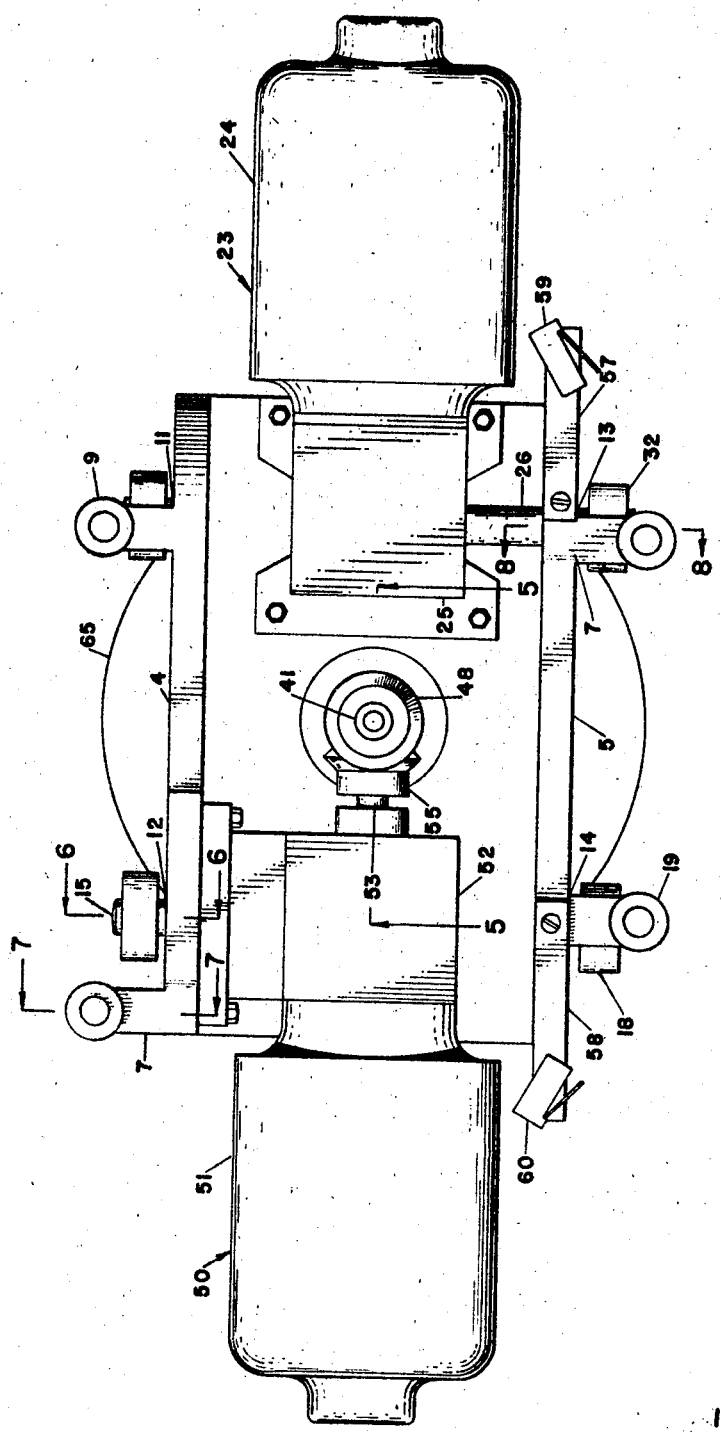
FIG. 4 is a top plan view of the carriage forming part of the present invention.

FIGS. 5, 6, 7, and 8 are sectional views taken along lines 5—5, 6—6, 7—7, and 8—8, respectively, of FIG. 4;

FIG. 9 is a sectional view taken along line 9—9 of FIG 3; and

Figure 10:
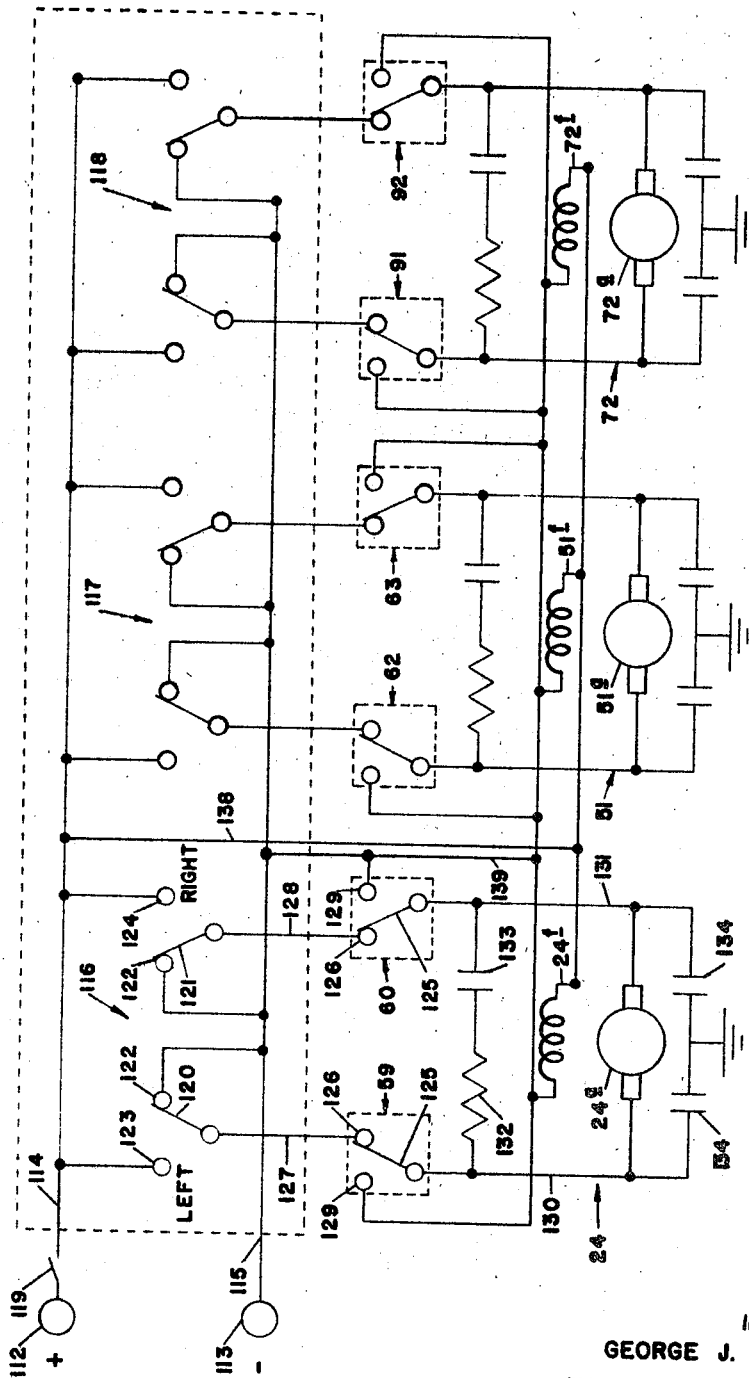

FIG. 10 is a schematic wiring diagram for the remotely controlled mount constructed in accordance with and embodying the present invention.

Figure 2:
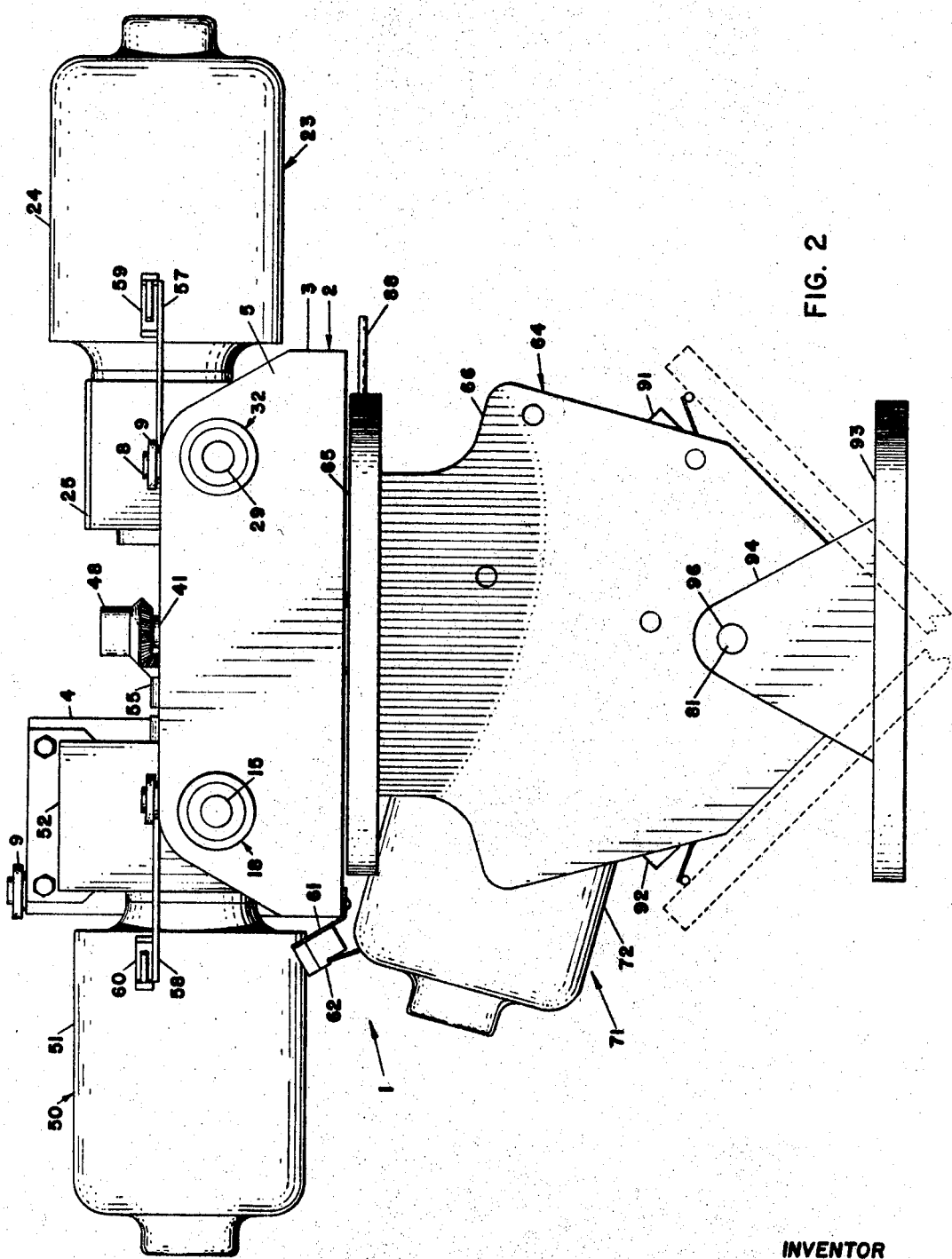
FIG. 2 is a side elevational view of a carriage forming part of the present invention and showing the tilt table in its maximum degree of tilt in dotted lines.

Referring now in more detail and by reference characters to the drawings which represent a preferred embodiment of the present invention, A designates a remotely controlled mount including a carriage 1 having a truck 2 which embodies a truck frame 3 preferably cast from steel or other suitable metal. Truck frame 3 is cast in the configuration illustrated in FIGS. 2, 3, 4, and includes upstanding side walls 4, 5 which are cast integral to and joined at their lower margins by a bight plate 6.

Cast integral to and projecting outwardly from the upper margins of side walls 4, 5 are guide wheel supports 7, each provided with an upwardly and perpendicularly projecting rivet 8. Journaled for rotatable movement around each of the rivets 8, for purposes presently more fully appearing, is a guide wheel 9 which is preferably molded from a low friction plastic. Side walls 4, 5 are provided with axially aligned apertures 11, 12, respectively, and 13, 14, respectively. Press-fitted into apertures 11, 12 and 14 are axle studs 15 each of which is diametrally reduced in the provision of a shoulder 16 and a spindle 17. Journaled on each of the spindles 17 in rotatable abutment with shoulder 16 is a wheel 18 comprising a rim 19 and a tire 20, the latter of which is fashioned from rubber or other suitable elastomeric material. The ends of axle studs 15 are provided with C rings 21 to prevent axial movement of wheels 18. For purposes presently more fully appearing, aperture 13 is provided with an insert sleeve bearing 22 which is preferably manufactured from bronze, brass, Babbitt metal, or other suitable bearing composition.

Bolted to the bight plate 6 of truck 2 is a gear motor 23 including a direct current shunt wound motor 24 and a gear box 25 having a drive shaft 26 projecting therefrom perpendicular to the axis of rotation of the armature of motor 24 and in axial registration with the aperture 13. The gear motor 23, being conventional in design and manufacture, is not illustrated or described herein in further detail. As best seen in FIG. 8, drive shaft 26 extends approximately half-way into sleeve 22 and is axially bored in the formation of an internal bore 27. Shaft 26 is further provided with a radially extending threaded hole 27 which accepts a set-screw 28. Provided for rotation with shaft 26 is an axle 29 which is turned down in the provision of a shoulder 30 and an axially extending shaft 31 which snugly fits within the bore 27, being retained therein by set-screw 28. When shaft 31 is fully inserted within the bore 27, shoulder 30 will abut against the annular end of shaft 26, while a portion of the axle 29 will be journaled within the sleeve bearing 22. The outwardly projecting portion of axle 29 is provided with a drive wheel 32 including a rim 33 and a tire 34. The rim 33, being pressed onto the axle 29, is precluded from freely rotating thereon and turns only with the axle 29 and shaft 26.

The center of bight plate 6 is cast in the formation of an upwardly presented cylindrical boss 35 which is drilled perpendicular to the bight plate 6 in the provision of an axially extending hole 36. Hole 36 is counterbored from each end to provide bearing recesses 37 which accept tapered roller thrust bearings 38 having races 39, 40. In this connection it should be noted that the bearing races 39, are pressed-fitted into the recesses 37 while the races 40 project slightly beyond the respective surfaces into which the bearings 38 are fitted, all as best seen in FIG. 5. The thrust bearings 38 are further disposed so as to receive opposed forces, that is to say, the upper bearing 38 is emplaced so as to receive a downwardly presented thrust on its race 39, while the lower bearing 38 is disposed so as to receive an upwardly presented thrust on its race 39.

Extending through hole 35 and journaled within the bearings 38 is a support shaft 41 provided at one end with a radially projecting flange 42. At its other end the shaft 41 is turned down in the provision of a gear shaft 43 which is flattened in the provision of a land 44. Intermediate its ends it is provided with a cylindrical body portion 45 having threads 46. The body portion 45 fits slidably within races 40 of bearings 38, the threads 46 being disposed upwardly and partially beyond the race 40 of the upper bearing 38. Provided for threaded engagement with the threads 46 is a nut 47 which is tightened against the upper bearing race 40, a washer 46' being disposed therebetween. Gear shaft 43 supports a miter gear 48 which is firmly secured thereto by a set-screw 49 which, in turn, bears against the land 44.

Operatively bolted to the inwardly presented face of side wall 4 is a gear motor 50 including a direct current shunt wound motor 51 and a gear box 52 having a drive shaft 53 projecting therefrom in parallel spaced relationship to the armature of motor 52, the drive shaft 53 being flattened in the provision of a land 54. Since the gear motor 50 is conventional in design and manufacture, it is not illustrated or described herein in further detail. Drive shaft 53 supports a miter gear 55 which meshes with miter gear 48, the gear 55 being attached to the drive shaft 53 by a set-screw 56 which bears the land 54.

Extending longitudinally in both directions from the upper margins of side wall 5 are the switch support arms 57, 58 which support the limiting switches 59, 60, respectively, all for purposes presently more fully appearing. Bolted to the lower face of bight plate 6 and projecting beyond the periphery thereof is a double mounting switch support arm 61 which supports the limiting switches 62, 63, also for purposes presently more fully appearing. Since limiting switches 59, 60, 62, 63 are conventional micro-switches of standard design, they are not described herein in further detail.

Disposed beneath truck 2 and supported by support shaft 41 is rotatable turntable 64 including an integrally cast circular plate 65 having spaced parallel walls 66, 67 projecting downwardly therefrom. The center of circular plate 65 is drilled to provide a hole 68 which accepts support shaft 41 of truck 2. Hole 68 is counterbored to provide a recess 69 which receives the flange 42, thereby providing a flush mounting support for the turntable 64, all as best seen in FIG. 5. Extending through flange 42 and threaded into circular plate 65 are bolts 70 which rigidly secure the shaft 41 to the turntable 64. Thus, any rotation of shaft 41 will impart a similar rotating movement to turntable 64. In this connection, it should be noted that nut 46 bearing against thrust washer 46' draws the upwardly presented face of circular plate 65 against the downwardly projecting race 39 of the lower roller bearing 38.

Bolted to the downwardly projecting wall 66 is gear motor 71 including a direct current shunt wound motor 72 and a gear box 73 having a drive shaft 74 projecting outwardly therefrom perpendicular to the axis of rotation of the armature of motor 72. Shaft 74 is provided with a planar land 75 for operatively supporting a worm-gear 76 which is firmly secured thereto by a set-screw 77 adapted and positioned to bear against the land 74.

Walls 66 and 67 are provided with axially aligned bores 78, 79, respectively, which accept the sleeve bearings 80, the bearings 80 being constructed from bronze, brass, Babbitt metal, or any other suitable bearing composition. Extending through the sleeve bearing 80 of hole 78 and provided for rotatable disposition therein is trunnion 81, the cylindrical surface of which is flattened on each end in the provision of the lands 82, 83. The inwardly presented end of trunnion 81 carries a worm-gear 84 which meshes with the worm-gear 76, the gear 84 being secured to the trunnion 81 by a set-screw 85 which seats against the land 82. Rotatably mounted in the sleeve bearing 80 of bore 79 and projecting outwardly therefrom is a trunnion 86 having a flattened land 87 on its outwardly presented cylindrical surface.

Projecting radially outwardly from the peripheral margin of circular plate 65 and threaded therein is a rod-like limiting stop 88, which, depending on the direction of rotation of circular plate 65, is adapted to register with and trip either of the limiting switches 62 or 63. The inwardly presented face of wall 67 is provided with switch mounts 89, 90 which carry limiting switches 91, 92, respectively, all for purposes presently more fully appearing. Since the limiting switches 91, 92 are micro-switches of conventional design and manufacture, they are not described herein in further detail.

Provided for cooperation with turntable 64 is tilt-table 93 including the integrally cast vertical triangular side walls 94, 95 which project therefrom in spaced parallel relation. The upper portions of triangular side walls 94, 95 are provided with axially aligned bores 96, 97, respectively, having threaded holes 98 radiating therefrom. Bore 96 snugly receives the outwardly projecting portions of trunnion 81, while the bore 97 accepts the outwardly projecting trunnion 86, all as best seen in FIG. 3. Disposed within threaded holes 98 are the set-screws 99 which seat against the respective lands 83, 87, thereby securing tilt-table 93 firmly to the trunnions 81, 86. Thus, it is readily apparent that the disposition or tilt of the tilt-table 93 is dependent on the degree of rotation of trunnion 81 which, in turn, is driven by gear-motor 71.

The downwardly presented face of tilt-table 93 carries a television camera T, but it should be understood that the use of mount A is not limited solely to television cameras, for studio lamps, microphones, and other pieces of equipment requiring variable positioning may also be attached thereto.

Provided for cooperation with carriage 1 is a suspended U-shaped channel or track 100 integrally including a top wall 101, side walls 102, 103, and two inwardly presented opposed flanges 104. Track 100 is bolted to and suspended from support members 105 which are securely fastened to a ceiling or other rigid structure. Spot welded or otherwise secured to the outwardly presented face of side wall 102 in the configuration illustrated in FIG. 3 are two vertically opposed flange-forming members 106. Projecting inwardly from side wall 103 at each terminus thereof for purposes presently more fully appearing, are stop-bolts 107.

Figure 1:
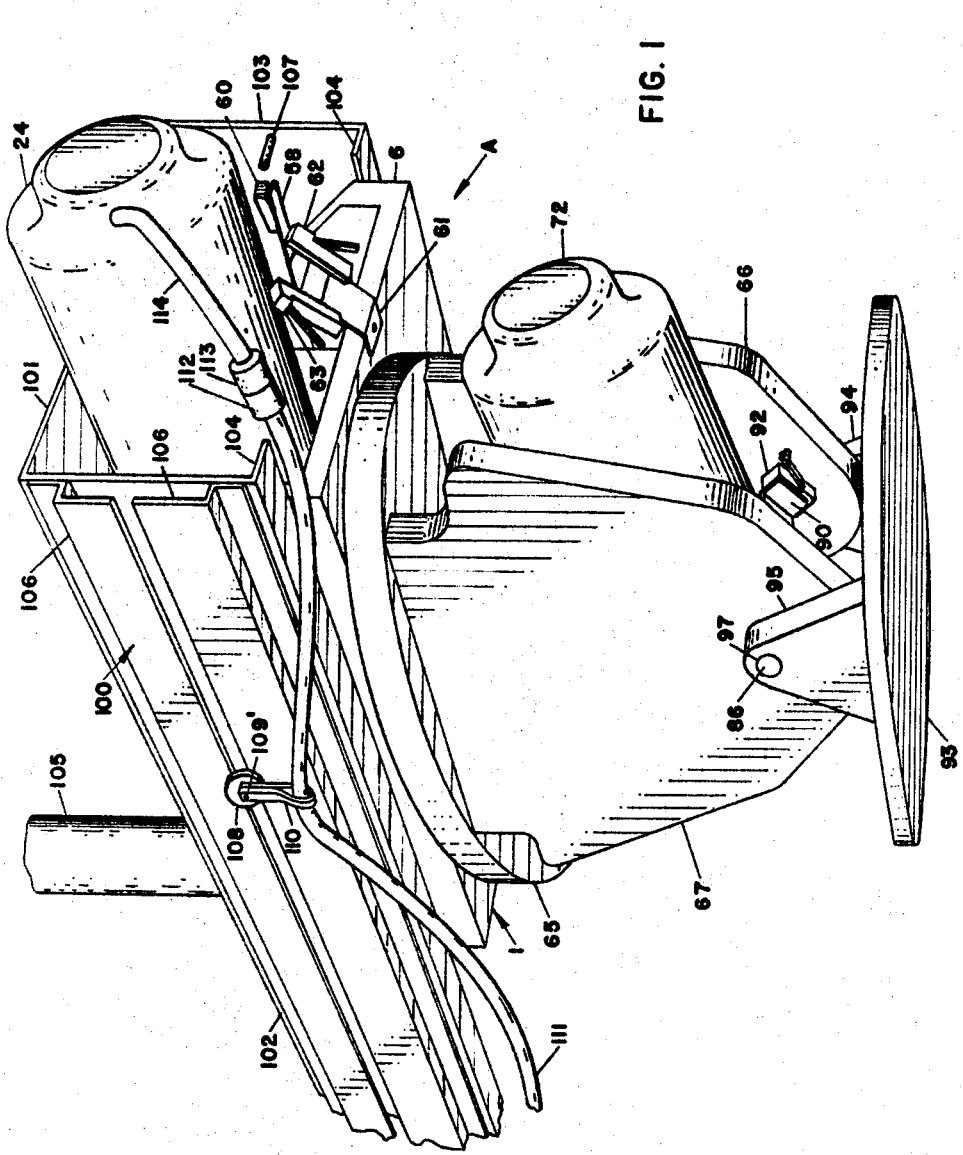
FIG. 1 is a perspective view of a remotely controlled mount constructed in accordance with and embodying the present invention.

As will be seen by reference to FIG. 1, truck 2 moves within the U-shaped inverted trough of track 100 on wheels 18, 32 which ride on the upwardly presented faces of flanges 104. Turntable 64 and tilt-table 93 project downwardly from the truck 2 and are, of course, free to perform their respective movements below the flanges 104.

Disposed between the vertically presented flange-forming members 106 and free to travel therebetween is a low friction plastic wheel 108 having a peripheral groove 109 which engages the margins of the two opposed flange-forming members 106. Thus, wheel 108 is free to move longitudinally between the members 106, but cannot be removed laterally therefrom. Journaled within wheel 108 is an axle-forming bolt 109' which extends through a cable support clamp 110 having disposed therethrough a cable or loom 111 which contains the electrical conductors for supplying power to carriage 1. The loom 111 is attached to a female cable connector 112 which receives a male connector 113, the male connector 113 being attached to the carriage loom 114 which extends into the carriage 1 and has its various conductors attached to the components thereof in such a manner as will presently be described in further detail. It should be noted that the flanges 106 can carry more than one wheel 108 and support clamp 110, the number used being dependent on the length of the track 100 and the loom 111.

Movement of carriage 1 along track 100 is obtained by energizing motor 24 which turns shaft 26 at a greatly reduced speed owing to the gear reduction achieved in the gear-box 25. Axle 29 which is locked to shaft 26 will also rotate and with it, the wheel 32. Wheel 32, being disposed on flange 104, will impart a horizontal movement to truck 2 and, of course, carriage 1. Wheels 18 will freely rotate on their respective axle studs 15 while supporting the truck 2 on the flanges 104. Guide wheels 9 keep the wheels 18 and 32 on the flanges 104 and prevent the truck 2 from scraping the inwardly presented surfaces of walls 102 and 103 of track 100. When the truck 2 reaches the right terminal end of track 100, that is to say, the right end as seen in FIG. 1, the trip lever of limiting switch 60 will register with and strike the right stop-bolt 107. This will de-energize motor 24 and prevent the carriage from traveling out of the open right end of track 100. Similarly, limiting switch 59 upon encountering the left stop-bolt 107 will de-energize the motor 24 and preclude the truck 2 from further travel. The wheel 108 follows the movement of the carriage 1, being drawn along between the flange-forming members 106 by the loom 111 which it supports.

When electrical energy is supplied to the motor 51, drive shaft 53 rotates at a greatly reduced speed due to the gear reduction accomplished in gear-box 52. Miter-gear 54 rotates the miter-gear 44 which in turn revolves support shaft 41. The turntable 64, being bolted to flange 42 of support shaft 41, turns therewith until limiting stop 88 trips the lever of either of the limiting switches 62, or 63, whereupon the motor 51 will be de-energized. Further rotation of the turntable 64 is thereby precluded which prevents the wires leading to the motor 72 and television camera T from becoming twisted and entabled. The upper thrust bearing 38 carried the downwardly presented thrust created by the weight of the turntable 64, tilt-table 93, and television camera T, as well as the compressive force induced by the tightened nut 46.

Finally, motor 72 by transmitting torque through gear-box 73, worm-gears 75, 84 and trunnion 81, within the limits of the opposed limiting switches 62, 63, controls the tilt or disposition of tilt table 93. Limiting switches 62, 63 de-energize motor 72 when the upper face of tilt table 93 strikes either of the trip levers of the switches 62, 63.

Remotely controlled mount A is wired as schematically shown in FIG. 10 to direct current power source having terminals 112, 113, which are electrically connected by leads 114, 115 to a console (not shown) having disposed therein the single pole, double throw, momentary on, off, momentary on, control switches 116, 117, 118. As will presently be described, the switches 116, 117, 118 are connected to and control the gear motors 23, 50, 71, respectively. Interposed in the lead 114 is a conventional single pole, single throw, power switch 119.

Switches 116, 117, 118 embody two manually operable moveable control elements 120, 121 which are normally spring biased against contacts 122, the contacts 122 being connected to the lead 115. Positioned in the path of the control elements 120 and 121 and connected to the lead 114 are the contacts 123, 124, respectively.

Double pole, single throw limit switches 59, 60 include the moveable elements 125 which are normally spring biased against the contacts 126 which are, in turn, connected to the moveable elements 120, 121, respectively, of switch 116 by the leads 127, 128. Limit switches 59, 60 have second contacts 129 which are ultimately connected to the lead 115 as illustrated in FIG. 10. The armature 24$^a$ of motor 24 is connected across the moveable elements 125 of limit switches 59, 60 through leads 130, 131. Shunted across the armature 24$^a$ to suppress sparks and connected in series to the leads 130, 131 are a resistance 132 and a capacitor 133. Connected between the armature terminals of motor 24 and ground to suppress any interference the motor might otherwise present in a television circuit are capacitors 134.

The armature 51$^a$ of motor 51 is connected in an identical manner through limit switches 62, 63 and through the control switch 117 to the leads 114, 115. Likewise, the armature 72$^a$ of motor 72 is connected through the limit switches 91, 92 and the control switch 118 to the leads 114 and 115. Since the operation of electrical connections associated with motors 51 and 72 are identical to that of motor 24, no effort will be made to described the operation or connections in further detail, it being assumed that one skilled in the art could understand the principles associated therewith from an examination of FIG. 10 and the description herein relating to motor 24.

Operatively connected to leads 114, 115 and extending therefrom through the loom 111 are leads 138, 139 which convey current to the shunt fields 24$^f$, 51$^f$, 72$^f$ of motors 24, 51, 72 respectively, the shunt fields 24$^f$, 51$^f$ 72$^f$ being connected in parallel thereacross.

By reference to FIG. 10 it is readily apparent that as moveable element 120 is moved away from the contact 122 and touches the contact 123, a circuit through the armature 24$^a$ of motor 24 is completed causing armature 24$^a$ to rotate and the truck 2 to roll to the left along the flanges 104 of track 100. When moveable element 120 is released, owing to the spring bias, it will again contact 122 and current will cease flowing to the motor 24. Similarly, when the moveable element 121 is moved so as to touch contact 124, the motor 23 will again be energized, but due to the reversal of polarity the armature 24ª will rotate in the opposite direction which, of course, will move the truck 2 along the track 100 in the opposite lateral direction.

When truck 2 approaches the left terminal end of track 100, the trip lever of limiting switch 59 will strike the stop-bolt 107, thereby throwing the moveable element 125 away from the contact 126 and against the second contact 129, whereby to break the circuit to the armature 24ª and cause the truck 2 to stop. The position of moveable element 125 of limit switch 59, however, does not preclude movement of truck 2 to the right, for when moveable element 120 of control switch 116 is manually moved into electrical contact with contact 124 the circuit through armature 24ª is completed in reversed polarity allowing the truck 2 to travel to the right along track 100. After truck 2 has pulled limit switch 59 away from the stop bolt 107, the moveable element 125 thereof will spring back into contact with contactor 126 which is also in electrical connection with lead 115 through the switch 116. A similar sequence of events occurs when limit switch 60 strikes stop-bolt 107 at the right terminus of traverse of truck 2, and is moved away therefrom by manually moving element 120 into contact with contactor 123. The limiting switches 62, 63, 91 and 92 operate in a similar manner and for that reason further discussion thereof is not necessary.

Since the fields 24ᶠ, 51ᶠ, and 72ᶠ are constantly energized, irrespective of the position of switches 116, 117, 118, the magnetic fields created will serve as a brake, so to speak, on the armatures 24ª, 51ª, 72ª and greatly impede any inertial rotation after the flow of current is interrupted thereto. This braking effect combined with the tendency of worm-gear 76 and elastomeric tire 20 to impede further rotational or lateral movement, whatever the case may be, affords precise positioning of the truck 2, turntable 64 and tilt-table 93.

It should be understood that changes and modifications in the form, construction, arrangement and combination of the several parts of the remotely controlled mounts may be made and substituted for those herein shown and described without departing from the nature and principle of my invention.

Having thus described my invention, what I claim and desire to secure by Letters Patent is:

1. A remotely controlled mount for holding equipment in the nature of a television camera, a studio light, a microphone, and the like which provides three degrees of motion for said equipment, said mount comprising an elongated, lightweight track, support members adapted to secure said track to a supporting structure of a building, said track having a plurality of spaced-apart guiding and supporting surfaces thereon, a small, lightweight truck which is supported by and which is adapted for movement forwardly and rearwardly along said track by wheels which engage and which are guided and supported by said spaced-apart guiding and supporting surfaces on said track, an electric motor that can be selectively energized to selectively drive said truck forwardly and rearwardly along said track, a turntable rotatably carried by said truck, a second electric motor that can be selectively energized to selectively rotate said turntable in the clockwise direction and in the counterclockwise direction relative to said truck, a tilt table rotatably carried by said turntable for holding said equipment, a third electric motor that can be selectively energized to selectively tilt said tilt table in the clockwise direction and in the counterclockwise direction relative to said turntable, all of said electric motors being carried by and moving with said truck, an elongated, readily flexible cable which has one end thereof movable with said truck to supply power to, and to permit remote control of, said three electric motors, and hence of the direction and extent of movement of said truck, of said turntable, and of said tilt table, and switches that are adapted to be located remotely from said track and from said truck and that are connected to said electric motors by said elongated cable, said switches being selectively actuatable to effect selective energization of the first said, said second, and said third electric motors, and thereby effect selective control of the direction and extent of movement of said truck, of said turntable, and of said tilt table, said one end and the adjacent portion of said elongated cable moving relative to said track as said truck is driven forwardly and rearwardly along said track by the first said electric motor, a further portion of said elongated cable extending along and being supported by said track.

2. A remotely controlled mount for holding equipment in the nature of a television camera, a studio light, a microphone, and the like which provides three degrees of motion for said equipment, said mount comprising an elongated lightweight horizontal track, support members adapted to secure said track to a supporting structure of a building, said track having a plurality of spaced-apart guiding and supporting surfaces thereon, a small, lightweight truck which is supported by and which is adapted for movement forwardly and rearwardly along said track by wheels which engage and are guided and supported by said spaced-apart guiding and supporting surfaces on said track, an electric motor that can be selectively energized to selectively drive said truck forwardly and rearwardly along said track, a turntable rotatably mounted on said truck for rotation about a vertical axis, a second electric motor that can be selectively energized to selectively rotate said turntable in the clockwise direction and in the counterclockwise direction relative to said truck, a tilt table for holding said equipment, a third electric motor that can be selectively energized to selectively tilt said tilt table in the clockwise direction and in the counterclockwise direction relative to said turntable, all of said electric motors being carried by and moving with said truck, said tilt table being rotatably mounted on said turntable for rotation about a horizontal axis, an elongated, readily flexible cable which has one end thereof movable with said truck to supply power to, and to permit remote control of, said three electric motors, and hence of the direction and extent of movement of said truck, of said turntable, and of said tilt table, and switches that are located remotely from said track and from said truck and that are connected to said electric motors by said elongated cable, said switches being selectively actuatable to effect selective energization of the first said, said second, and said third electric motors and thereby effect selective control of the direction and extent of movement of said truck, of said turntable, and of said tilt table, said one end and the adjacent portion of said elongated cable moving relative to said track as said truck is driven forwardly and rearwardly along said track by the first said electric motor.

3. A remotely controlled mount for holding equipment in the nature of a television camera, a studio light, a microphone, and the like which provides three degrees of motion for said equipment, said mount comprising an elongated, lightweight track having two horizontal flanges, support members adapted to secure said track to a supporting structure of a building, a truck having wheels adapted to ride on and to be supported and guided by said flanges for movement forwardly and rearwardly along said track, an electric motor that can be selectively energized to selectively drive said truck forwardly and rearwardly along said track, a turntable rotatably carried by said truck for rotation about a vertical axis, a second electric motor that can be selectively energized to selectively rotate said turntable in the clockwise direction and in the counterclockwise direction relative to said truck, a tilt table for holding said equipment, said tilt table being rotatably carried by said turntable for rotation in the clockwise direction and in the counterclockwise direction about a horizontal axis, a third electric motor that can be selectively energized to selectively tilt said tilt table in the clockwise direction and in the counterclockwise direction relative to said turntable, all of said electric motors being carried by and moving with said truck, an elongated, readily flexible cable which has one end thereof movable with said truck to supply power to, and to permit remote control of, said three electric motors, and hence of the direction and extent of movement of said truck, of said turntable, and of said tilt table, and a means for remotely controlling the direction and extent of movement of said truck, of said turntable and of said tilt table, said means being connected to said electric motors by said elongated cable, and a movable cable supporting element that is supported by but is movable relative to said track, said elongated cable engaging and being, in part, supported by said movable supporting element to keep said cable from drooping downwardly appreciable distances below the level of said track.

4. A remotely controlled mount for holding equipment in the nature of a television camera, a studio light, a microphone, and the like which provides three degrees of motion for said equipment, said mount comprising an elongated lightweight track having two vertical side walls connected at their upper margins by a top wall, said side walls having lower margins provided with inwardly presented opposed horizontal flanges, support members adapted to secure said track to a supporting structure of a building, a small, lightweight truck having wheels adapted to ride on and to be guided and supported by said flanges, an electric motor that can be selectively energized to selectively drive said truck forwardly and rearwardly along said track, a turntable rotatably carried by said truck for rotation in the clockwise direction and in the counterclockwise direction about a vertical axis, a second electric motor that can be selectively energized to selectively rotate said turntable in the clockwise direction and in the counterclockwise direction relative to said truck, a tilt table for holding said equipment, said tilt table being rotatably carried by said turntable for rotation in the clockwise direction and in the counterclockwise direction about a horizontal axis, a third electric motor that can be selectively energized to selectively tilt said tilt table in the clockwise direction and in the counterclockwise direction relative to said turntable, all of said electric motors being carried by and moving with said truck, an elongated, readily flexible cable which has one end thereof movable with said truck to supply power to, and to permit remote control of, said three electric motors, and hence of the direction and extent of movement of said truck, of said turntable, and of said tilt table, and a means for remotely controlling the power supplied to said electric motors and thereby controlling the direction and extent of the movements of said truck, turntable, and tilt table, said means being connected to said electric motors by said elongated cable.

5. A remotely controlled mount for handling equipment in the nature of a television camera, a studio light, a microphone, and the like which provides three degrees of motion for said equipment, said mount comprising an elongated, lightweight track having spaced parallel side walls provided with opposed inwardly projecting horizontal flanges, support members adapted to secure said track to a supporting structure of a building, a small, lightweight truck having wheels adapted to ride on and to be supported by said flanges for forward and rearward movement relative to said track, at least one of said wheels being operatively connected to a first driving means that includes an electric motor which can be selectively energized to drive said truck forwardly and rearwardly along said track, a turntable rotatably carried by said truck for rotation in the clockwise direction and in the counterclockwise direction about a vertical axis, a second driving means operatively associated with said turntable for rotating the same in the clockwise direction and in the counterclockwise direction about said vertical axis that includes a second electric motor which can be selectively energized to rotate said turntable in the clockwise direction and in the counterclockwise direction relative to said truck, a tilt table journaled to said turntable for rotation in the clockwise direction and in the counterclockwise direction about an axis which lies in a horizontal plane, a third driving means operatively associated with said tilt table for rotating the same in the clockwise direction and in the counterclockwise direction about said horizontal axis that includes a third electric motor which can be selectively energized to selectively tilt said tilt table in the clockwise direction and in the counterclockwise direction relative to said turntable, an elongated, readily flexible cable which has one end thereof movable with said truck to supply power to, and to permit remote control of, said three electric motors, and hence of said truck, of said turntable, and of said tilt table, and means for remotely controlling said first, second and third driving means, said control means being selectively actuatable to effect selective energization of the first said, said second and said third electric motors, and thereby effect selective control of the direction and extent of movement of said truck, of said turntable, and of said tilt table.

References Cited

UNITED STATES PATENTS

| | | | |
|---|---|---|---|
| 2,713,609 | 7/1955 | Niklason | 95—86 X |
| 2,293,207 | 8/1942 | Haskin | 95—86 X |
| 2,348,841 | 5/1944 | Oswald | 95—14 X |
| 2,725,783 | 12/1955 | Jackson | 95—86 X |
| 3,143,326 | 8/1964 | Hamilton | 95—86 X |
| 3,164,838 | 1/1965 | Heinnich | 352—69 |

JOHN M. HORAN, *Primary Examiner.*